(12) United States Patent
Wolf et al.

(10) Patent No.: US 8,878,413 B2
(45) Date of Patent: Nov. 4, 2014

(54) ALTERNATING-CURRENT GENERATOR HAVING A STATOR AND A STATOR WINDING MADE OF WINDING ELEMENTS INSERTED IN STATOR SLOTS AND A METHOD FOR PRODUCING A STATOR OF THE PRESENT INVENTION

(75) Inventors: Gert Wolf, Affalterbach (DE); Thomas Berger, Ditzingen (DE); Eberhard Rau, Korntal-Muenchingen (DE); Alexander Shendi, Asperg (DE); Helmut Kreuzer, Schwieberdingen (DE); Christoph Schwarzkopf, Walheim (DE)

(73) Assignee: Robert Bosch GmbH, Stuttgart (DE)

( * ) Notice: Subject to any disclaimer, the term of this patent is extended or adjusted under 35 U.S.C. 154(b) by 948 days.

(21) Appl. No.: 12/521,607

(22) PCT Filed: Jan. 2, 2008

(86) PCT No.: PCT/EP2008/050018
§ 371 (c)(1),
(2), (4) Date: Nov. 12, 2010

(87) PCT Pub. No.: WO2008/081020
PCT Pub. Date: Jul. 10, 2008

(65) Prior Publication Data
US 2011/0043059 A1 Feb. 24, 2011

(30) Foreign Application Priority Data
Dec. 29, 2006 (DE) .......................... 10 2006 062 594

(51) Int. Cl.
*H02K 3/04* (2006.01)
*H02K 9/00* (2006.01)
*H02K 15/04* (2006.01)
*H02K 3/28* (2006.01)
*H02K 9/06* (2006.01)

(52) U.S. Cl.
CPC ................ *H02K 15/045* (2013.01); *H02K 9/06* (2013.01); *H02K 3/28* (2013.01)
USPC ............. 310/208; 310/195; 310/201; 310/58; 310/62

(58) Field of Classification Search
CPC ............. H02K 3/04; H02K 3/14; H02K 3/12
USPC ................................................... 310/179–208
IPC ........................................................ H02K 3/04
See application file for complete search history.

(56) References Cited

U.S. PATENT DOCUMENTS

| 3,187,245 A | * | 6/1965 | Sisk et al. ....................... 318/778 |
| 5,619,787 A | * | 4/1997 | Couture et al. .................. 29/596 |
| 5,892,313 A | * | 4/1999 | Harris et al. .................... 310/263 |
| 5,982,068 A | * | 11/1999 | Umeda et al. .................. 310/206 |
| 6,140,735 A | | 10/2000 | Kato et al. |
| 6,166,461 A | | 12/2000 | Kusase et al. |
| 6,498,413 B2 | * | 12/2002 | Imori et al. .................... 310/180 |
| 6,703,750 B2 | * | 3/2004 | Nakamura ..................... 310/184 |
| 6,791,227 B2 | * | 9/2004 | Yasuhara et al. ............... 310/201 |
| 2003/0011268 A1 | | 1/2003 | Even et al. |
| 2003/0015932 A1 | | 1/2003 | Oohashi et al. |

FOREIGN PATENT DOCUMENTS

| CA | 274423 | 10/1927 | |
| DE | 199 22 794 | 11/1999 | |
| EP | 740403 A1 | * 10/1996 | |
| EP | 0 967 709 | 12/1999 | |
| EP | 1 134 872 | 9/2001 | |
| EP | 1 376 828 | 1/2004 | |
| JP | 51-107401 | 3/1976 | |
| JP | 53-53502 | 5/1978 | |
| JP | 2-219441 | 9/1990 | |
| JP | 9-103052 | 4/1997 | |
| JP | 2002-165421 | 6/2002 | |
| JP | 2004-516784 | 6/2004 | |
| JP | 2005051981 A | * 2/2005 | ............... H02K 3/04 |
| JP | 2006-271015 | 10/2006 | |

OTHER PUBLICATIONS

Machine Translation, JP 2005051981 A, Feb. 24, 2005.*

* cited by examiner

*Primary Examiner* — Quyen Leung
*Assistant Examiner* — Thomas Truong
(74) *Attorney, Agent, or Firm* — Kenyon & Kenyon LLP

(57) ABSTRACT

An alternating-current generator, in particular a three-phase generator, for a motor vehicle, having a rotor including north and south poles, particularly having claw-pole fingers extending in the axial direction and alternating as north and south poles at the rotor's periphery, a stator having a magnetic core, especially laminated core, having slots and a stator winding disposed in the magnetic core's slots, the stator winding having winding overhangs that are coolable by an approximately radial air flow produced by at least one fan mounted at the rotor, the stator being situated opposite the rotor, and the stator and the rotor having defined positions relative to each other, the multiphase stator winding being made up of winding elements, at least one winding element having more than two sections inserted in slots, and at least one winding element having more than one reversal section which brings about a change in the radial position.

16 Claims, 11 Drawing Sheets

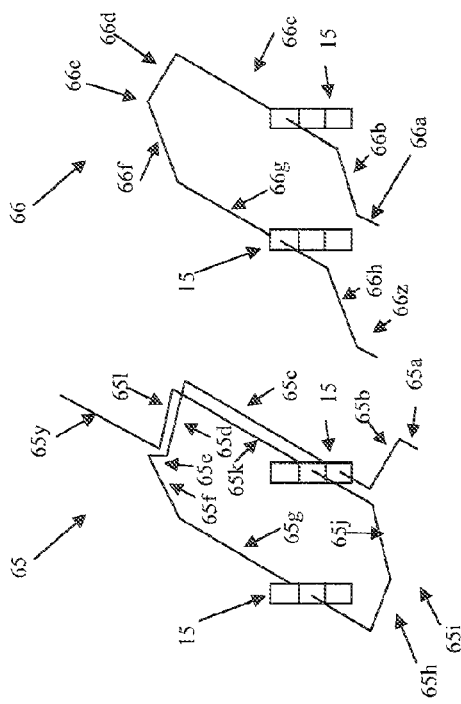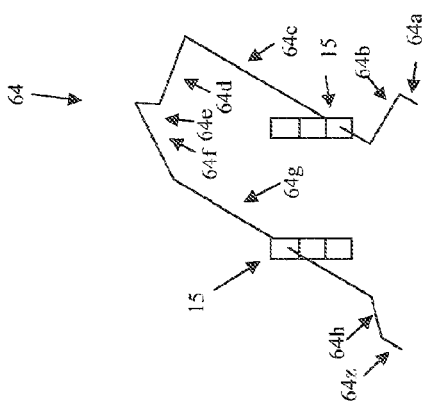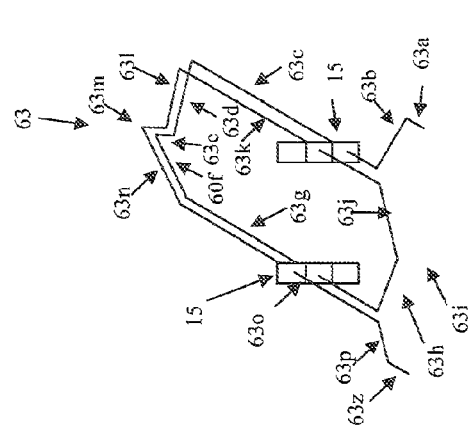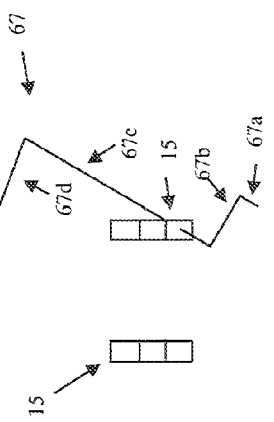

ALTERNATING-CURRENT GENERATOR HAVING A STATOR AND A STATOR WINDING MADE OF WINDING ELEMENTS INSERTED IN STATOR SLOTS AND A METHOD FOR PRODUCING A STATOR OF THE PRESENT INVENTION

FIELD OF THE INVENTION

The present invention relates to various forms of winding elements for producing a winding for an electrical machine, particularly for a multi-phase motor-vehicle generator, having a claw-pole rotor and fans situated in the housing.

BACKGROUND INFORMATION

Stator windings are familiar from the related art, having a disordered wire path in the winding overhangs which are obtained, for example, by inserting a plurality of single, especially single-layer phase windings individually one after another into a laminated core, e.g., into a ring-shaped laminated core using a pull-in method or into a cuboidal laminated core using an insertion method. The wire paths of the individual coil ends of the winding assembled from many wires intersect in the winding overhang. The wires thereby touch one another and are not set apart relative to each other, so that the cooling air does not flow through the winding overhangs, but rather is only able to circumflow them in their entirety, and therefore only the boundary layer of the winding-overhang envelope body is brushed against. These disordered windings cause large winding-overhang dimensions on both sides.

Stator windings having structured winding overhangs are also known, which are markedly more compact. Using the insert/twist technique, essentially U-shaped conductor sections are inserted axially from a first laminated-core end face into slots of a laminated core, afterwards the free ends of the U-shaped conductor sections on the laminated-core end face opposite the first laminated-core end face initially being tilted essentially tangentially or bent into a desired form or position, and subsequently being joined in each case to one end of another conductor section, e.g., by welding. Advantages are thereby yielded with regard to the overall length of the generator, the total weight and the ohmic losses in the copper wire used. The disadvantage is the great number of interconnection points that, primarily in the case of small models of electrical machines, places high spatial demands on the joining technique with regard to the tilting and/or the welding, which prolongs manufacturing time and increases costs.

SUMMARY OF THE INVENTION

According to a first embodiment of the present invention, an alternating-current generator, in particular a three-phase generator, is provided for a motor vehicle, having a rotor including north and south poles, particularly with claw-pole fingers extending in the axial direction and alternating as north and south poles at the periphery of the rotor, a stator which has a magnetic core, especially a laminated core, with slots and a stator winding disposed in the slots of the magnetic core, the stator winding having winding overhangs that in each case are able to be cooled by an approximately radial air flow produced by at least one fan mounted at the rotor, the stator being situated opposite the rotor, and the stator and the rotor having defined positions relative to each other, the multiphase stator winding being made up of winding elements, at least one winding element having more than two sections inserted in slots, and at least one winding element having more than one reversal section which brings about a change in the radial position.

The advantages are:
lower expenditure for joining the individual winding elements
due to a lower number of winding-overhang connections (welding points), fewer winding sections are covered by corrosion protection, and cooling is therefore improved
easy producibility of the winding elements
reduced time for assembling the winding elements in the laminated core, compared to hairpins having two sections inserted in the slot
cooling through sections set apart in the winding overhang and insulation quality improved by increasing the insulating clearances (air gap).

In the following, the exemplary embodiments and/or exemplary methods of the present invention shall be described in greater detail based on several drawings.

BRIEF DESCRIPTION OF THE DRAWINGS

FIG. 8 shows a schematic representation of a first basic form of the winding element for uneven numbers of conductors.

FIG. 9 shows a schematic representation of a second basic form of the winding element for uneven numbers of conductors.

FIG. 10 shows a schematic representation of a first connection form of the winding element for uneven numbers of conductors.

FIG. 11 shows a schematic representation of a reversal form of the winding element.

FIG. 12 shows a schematic representation of a second connection form of the winding element for uneven numbers of conductors.

DETAILED DESCRIPTION

Figure 1:
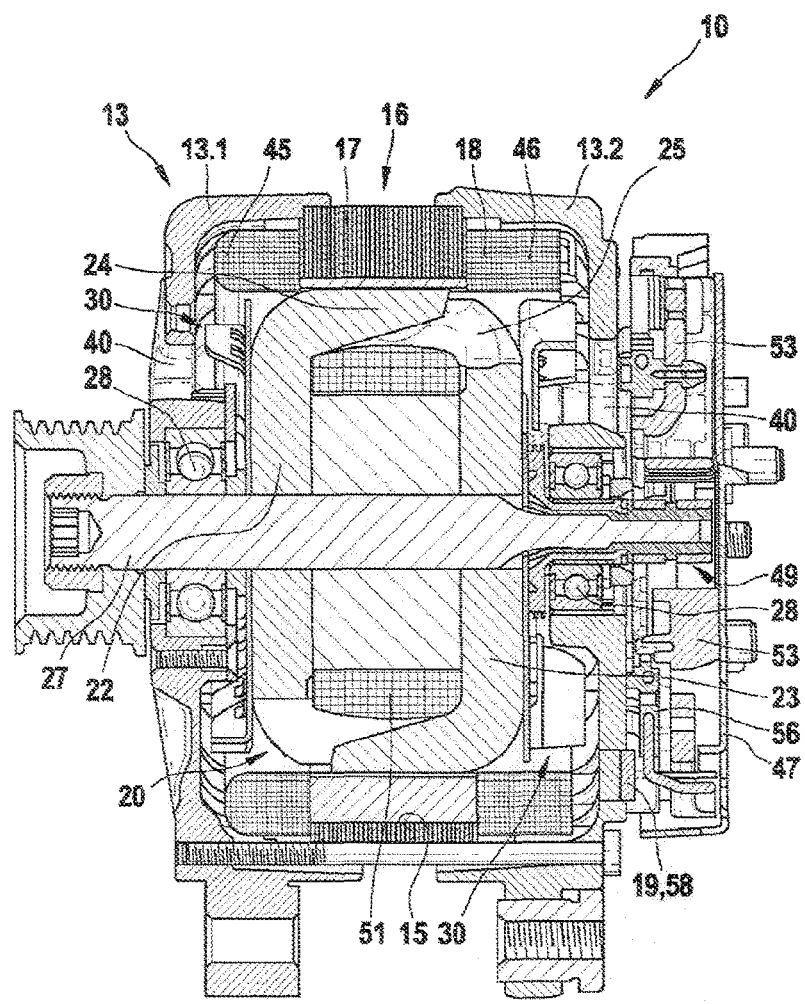
FIG. 1 shows a longitudinal section through an alternating-current generator for motor vehicles having a claw-pole rotor.

FIG. 1 shows a section through an alternating-current generator 10 for motor vehicles. Among other things, it has a two-part housing 13 made up of a first end shield 13.1 and a second end shield 13.2. Accommodated in end shield 13.1 and end shield 13.2 is a stator 16 having a circular ring-shaped laminated core 17 as magnetic core, into whose radially inwardly open and axially extending rectangular slots 15, a stator winding 18 is inserted. With its radially inwardly directed surface, ring-shaped stator 16 surrounds an electromagnetically excited rotor 20 in the form of a claw-pole rotor. Rotor 20 is made up, among other things, of two claw-pole plate bars 22 and 23, at whose periphery claw-pole fingers 24 and 25 are disposed, each extending in the axial direction. Both claw-pole plate bars 22 and 23 are disposed in rotor 20 in such a way that their claw-pole fingers 24, 25, extending in the axial direction, alternate as north and south poles at the periphery of rotor 20.

Magnetically necessary claw-pole interspaces thereby result between oppositely magnetized claw-pole fingers 24 and 25, which, because claw-pole fingers 24 and 25 taper toward their free ends, run slightly at an angle with respect to the machine axis. For the following description of the exemplary embodiments and/or exemplary methods of the present invention, this progression is denoted in simplified form as axial. Rotor 20 is rotationally mounted in end shields 13.1 and 13.2, respectively, with the aid of a shaft 27 and a rolling-contact bearing 28 located on each side. It has two axial end faces, at which in each case a fan 30 is secured. These fans 30 are made essentially of a plate-shaped or disk-shaped section, from which fan blades go out in known manner. These fans 30 serve to allow an exchange of air between the outside and the interior space of electrical machine 10 via openings 40 in end shields 13.1 and 13.2. To that end, openings 40 are provided at the axial ends of end shields 13.1 and 13.2, via which cooling air is drawn into the interior space of electrical machine 10 with the aid of fans 30. This cooling air is accelerated radially to the outside by the rotation of fans 30, so that it is able to pass through winding overhangs—permeable to the cooling air—45 on the drive end and 46 on the electronics side. The winding overhangs are cooled by this effect.

After flowing through or after circumflowing the winding overhangs, the cooling air takes a path radially to the outside through openings (not shown) in end shields 13.1 and 13.2. The winding overhangs are the winding sections situated outside of the magnetic core. Located on the right side in FIG. 1 is a protective cap 47 which protects various components from environmental influences. Thus, this protective cap 47 covers a slip-ring assembly 49, for example, which supplies an exciter winding 51 with excitation current. The excitation current is adjusted by a voltage regulator in such a way that a constant electrical-system voltage is available. Disposed around this slip-ring assembly 49 is a heat sink 53, which acts here as a heat sink for the plus diodes of the rectifier. End shield 13.2 acts here as heat sink for the minus diodes of the rectifier. It is also customary to dispose the minus diodes in a separate heat sink. Situated between end shield 13.2 and heat sink 53 is a connecting plate 56 which interconnects minus diodes 58, secured in end shield 13.2, and plus diodes (not shown) of a rectifier 19 in heat sink 53 in the form of a bridge connection.

Figure 2:
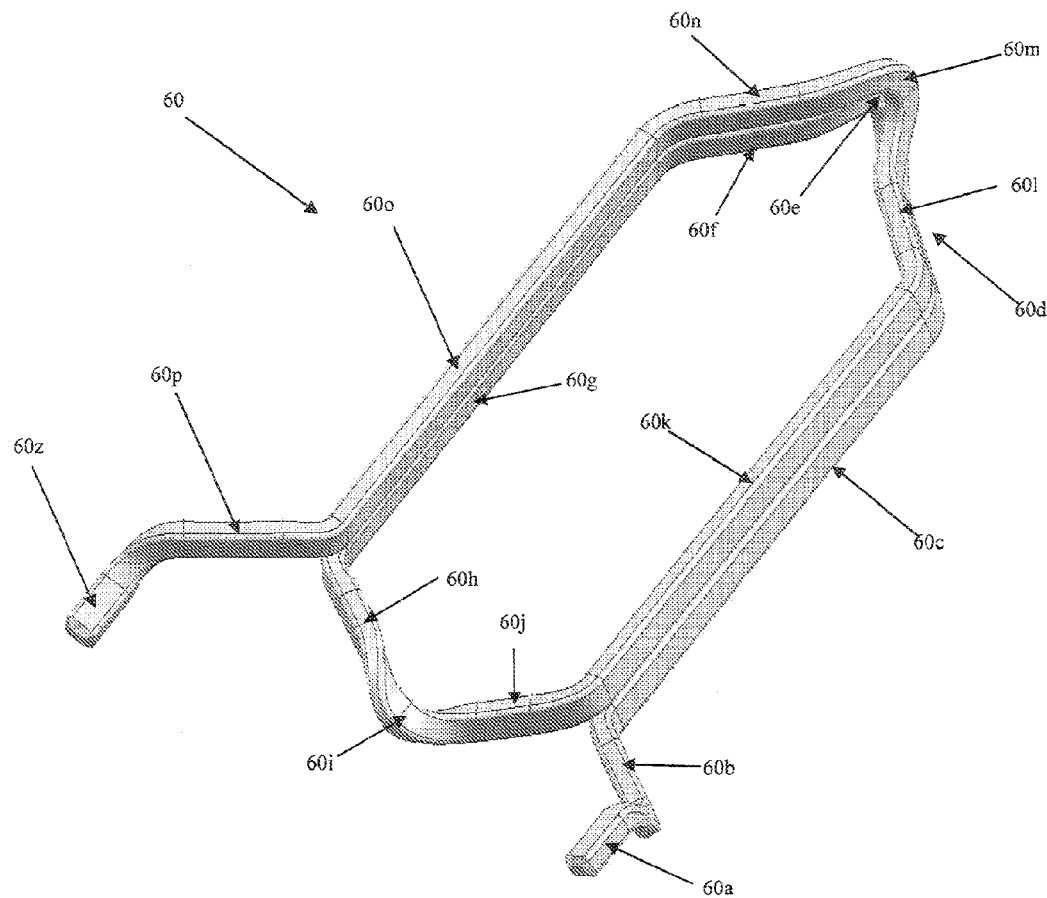
FIG. 2 shows a perspective representation of a basic form of a winding element.

FIG. 2 shows one possible basic form of a winding element 60 for a realization form of a winding having four conductors in each slot, the narrow sides of the conductor cross-sections being located opposite each other and the broad sides of the conductor cross-sections facing the slot walls (not shown here). The conductors are disposed in the slot in four radial slot positions, the radially outermost slot position being denoted as slot position one and the radially innermost slot position being denoted as slot position four. Each winding element 60 is made up of at least one essentially axially aligned first connecting section 60a, which is used for contacting two radially adjacent connecting sections 60a, 60z, 62a, 62z.

To that end, it is advantageous if the broad side of the conductor cross-section in the area of the connecting sections is aligned parallel or essentially parallel to the circumferential direction, since the contacting area is thereby increased. The contacting is accomplished integrally, for example, by welding, soldering or other methods for accomplishing electrical contacting.

First connecting section 60a merges into a first section 60b that is inclined with respect to the axis direction and circumferential direction and connects first connecting section 60a to a first axially aligned section 60c of winding element 60 inserted in a slot 15. First section 60c lying in a first slot changes into a second section 60d inclined with respect to the axis direction and circumferential direction, which further merges into a first reversal section 60e. Going out from first reversal section 60e is a third section 60f inclined with respect to the axis direction and circumferential direction, which connects first reversal section 60e to a second section 60g inserted in a second slot 15. This second section 60g lying in slot 15 is connected to a fourth section 60h inclined with respect to the axis direction and circumferential direction, which merges into a second reversal section 60i that is further connected via a fifth section 60j, inclined with respect to the axis direction and circumferential direction, to a third section 60k of winding element 60 inserted in the first slot.

Third section 60k lying in the slot is joined via a sixth section 60l, inclined with respect to the axis direction and circumferential direction, to a third reversal section 60m. Third reversal section 60m is connected via a seventh section 60n, inclined with respect to the axis direction and circumferential direction, to a fourth section 60o inserted in the second slot. Fourth section 60o lying in the slot is further connected via an eighth section 60p, inclined with respect to the axis direction and circumferential direction, to second connecting section 60z of the winding element.

The basic form of the winding element shown here is constructed using three reversal sections 60e, 60i, 60m. It is also conceivable to realize the basic form of winding element 60 using two or more than three reversal sections, by decreasing or increasing the number of loops of a winding element.

When using two or, for example, four reversal sections, however, winding elements adjoining each other must then be contacted with each other on both sides of laminated core 17, which is associated with higher machinery costs and work required.

In this example, the winding element assumes four different radial positions, the position of the conductors in the winding overhangs being designated by a radial position, and the position of the conductors in slots 15 being designated by a radial slot position, and the radial positions of the slot position and of the radial position of the conductors in the winding overhangs corresponding to each other. The sections inserted in the slots form a radial row and therefore may be better manipulated, since the sections exist in ordered fashion.

The number of radial positions and that of the radial slot positions usually corresponds to the number of conductors in one slot, given a one-row arrangement of the conductors radially one upon the other. Of winding element 60, disposed in the radially first position are first inclined section 60b, first section 60c inserted in the slot and second inclined section 60d. Winding element 60 occupies the first slot position in a first slot 15, and in the second slot associated with winding element 60, which is set apart from the first in the circumferential direction by essentially one pole pitch, occupies the third slot position. The change in the slot position is brought about by first reversal section 60e. Disposed in the radially third position are third inclined section 60f, second section 60g inserted in a slot and fourth inclined section 60h. Second reversal section 60i causes a change in the slot position from the third slot position of second slot 15 to the second slot position of first slot 15.

Disposed in the radially second position are fifth inclined section 60j, third section 60k lying in a slot and sixth inclined section 60l. Third reversal section 60m brings about a change in the slot position from the second slot position of the first slot to the fourth slot position of the second slot. Disposed in the radially fourth position are seventh inclined section 60n, fourth section 60o lying in a slot and eighth inclined section 60p.

First connecting section 60a extends over the second and first radial position. Second connecting section 60z extends over the fourth and third radial position.

The change of the radial positions in uneven reversal sections is greater than in even reversal sections. The winding element thereby has a non-crossing wire guide in the winding overhang, the wires are set apart to a great extent in the winding overhang, and in this manner, the cooling is improved.

Figure 3:
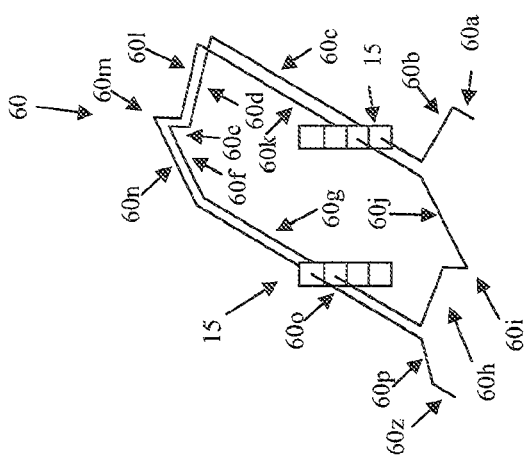
FIG. 3 shows a schematic representation of the basic form of the winding element.

FIG. 3 shows a schematic representation of the winding element described under FIG. 2.

Figure 4:
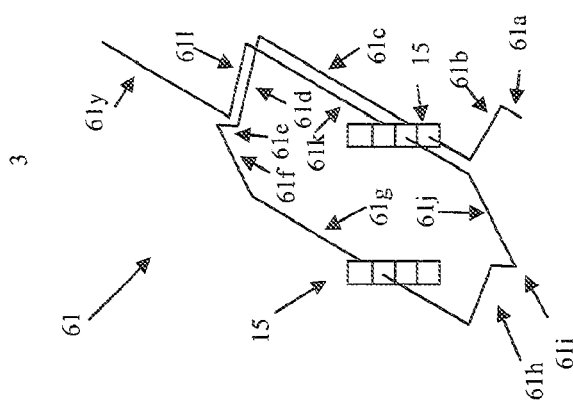
FIG. 4 shows a schematic representation of a connection form of the winding element.

FIG. 4 shows a schematic representation of the connection form of a winding element 61 needed for a complete stator winding. This connection form is used to make available an electrical connection for the interconnection of the phase winding, or for the contacting of the rectifier. This connection may be on winding-overhang side 46 on the electronics side. At least two connection forms of winding element 61 are necessary to form a complete phase winding—for the phase-winding beginning and the phase-winding end, respectively.

The connection form of the winding element corresponds for the most part to an abbreviated construction of the basic form.

Depicted connection form 61 of the winding element is provided for an implementation with four conductors in each slot, the narrow sides of the conductor cross-sections being located opposite each other and the broad sides of the conductor cross-sections facing the slot wall. Each connection form of winding element 61 is made up of at least one essentially axially aligned first connecting section 61a, which is used for contacting two radially adjacent connecting sections 61a, 60z.

First connecting section 61a merges into a first section 61b that is inclined with respect to the axis direction and circumferential direction and connects first connecting section 61a to a first axially aligned section 61c of winding element 61 inserted in a slot 15. First section 61c lying in a first slot changes into a second section 61d inclined with respect to the axis direction and circumferential direction, which further merges into a first reversal section 61e. Going out from first reversal section 61e is a third section 61f inclined with respect to the axis direction and circumferential direction, which connects first reversal section 61e to a second section 61g inserted in a slot 15.

This second section 61g lying in slot 15 is connected to a fourth section 61h inclined with respect to the axis direction and circumferential direction, which merges into a second reversal section 61i that is further connected via a fifth section 61j, inclined with respect to the axis direction and circumferential direction, to a third section 61k of winding element 61 inserted in the first slot. Third section 61k lying in the slot is connected via a sixth section 61l, inclined with respect to the axis direction and circumferential direction, to connection segment 61y.

The connection form of winding element 61 shown here is constructed using two reversal sections 61e, 61i. In principle, it is also conceivable here to implement the connection form of winding element 61 using one, two or more reversal sections 61e, 61i.

In this example, the connection form of winding element 61 is subdivided into three radial positions.

The number of radial positions of the connection form of winding element 61 is usually less by one than the number of conductors in a slot 15. Of the connection form of winding element 61, disposed in the radially first position are first inclined section 61b, first section 61c inserted in the slot and second inclined section 61d. The connection form of winding element 61 occupies the first slot position in a first slot 15, and in second slot 15 associated with winding element 61, which is set apart from the first in the circumferential direction by essentially one pole pitch, occupies the third slot position. The change in the slot position is brought about by first reversal section 61e. Disposed in the radially third position are third inclined section 61f, second section 61g inserted in a slot and fourth inclined section 61h. Second reversal section 61i causes a change in the slot position from the third slot position of second slot 15 to the second slot position of first slot 15.

Disposed in the radially second position are fifth inclined section 61j, third section 61k inserted in a slot, sixth inclined section 61l and connection segment 61y. First connecting section 61a extends over the second and first radial position. Connection segment 61y extends essentially over the third radial position, but to improve the interconnection of the phase windings, may change from the third slot position to a different slot position.

Figure 5:
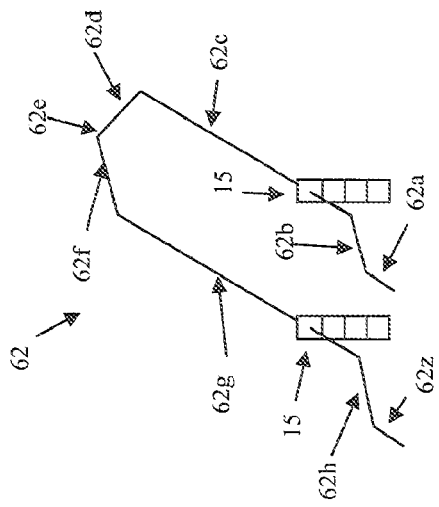
FIG. 5 shows a schematic representation of a reversal form of the winding element.

FIG. 5 shows a schematic representation of the reversal form of a winding element 62 needed for a complete stator winding. The reversal form of a winding element 62 is used to connect basic forms of winding elements 60 in series with basic forms 60 shifted by 180 electrical degrees. In this context, the phase-winding course coming from a first circumferential direction is reversed and continued counter to the first circumferential direction. At least one reversal form of winding element 62 is needed to form a complete phase winding. This reversal form of a winding element 62 has at least one reversal section 62e which connects two sections 62c, 62g lying in slots, in the same slot position.

The depicted reversal form of winding element 62 is provided for a realization with four conductors in each slot, the narrow sides of the conductor cross-sections being located opposite each other and the broad sides of the conductor cross-sections facing the slot wall. Each reversal form of winding element 62 is made up of at least one essentially axially aligned first connecting section 62a, which is used for contacting two radially adjacent connecting sections 62a, 60a.

First connecting section 62a merges into a first section 62b that is inclined with respect to the axis direction and circumferential direction and connects first connecting section 62a to a first axially aligned section 62c of winding element 62 inserted in a slot 15. First section 62c lying in a first slot changes into a second section 62d inclined with respect to the axis direction and circumferential direction, which further merges into a first reversal section 62e. Going out from first reversal section 62e is a third section 62f inclined with respect to the axis direction and circumferential direction, which connects first reversal section 62*e* to a second section 62*g* inserted in a slot 15. This second section 62*g* lying in slot 15 is connected to a fourth section 62*h* inclined with respect to the axis direction and circumferential direction, which is connected to second connecting section 62*z*

The reversal form of winding element 62 shown here is constructed using one reversal section 62*e*. In principle, it is also conceivable here that the reversal form of winding element 61 may be implemented not only with one, but also with a different uneven number of reversal sections, all connecting sections being disposed on one winding-overhang side. It is also possible in principle to implement the reversal form of the winding element using an even number of reversal sections, connecting sections then being disposed on both winding-overhang sides.

In this example, the reversal form of winding element 62 is disposed in one radial position.

The number of radial positions of the reversal form of winding element 62 is usually one. The reversal form may occupy the radially innermost position, thereby ensuring easy assembly. Of the reversal form of winding element 62, disposed in the radially fourth position are thus first inclined section 62*b*, first section 62*c* inserted in the slot, second inclined section 62*d*, first reversal section 62*e*, third inclined section 62*f*, second section 62*g* inserted in a slot and fourth inclined section 62*h*.

First connecting section 62*a* extends over the third and fourth radial position. Second connecting section 62*z* extends essentially over the fourth and third radial position.

Figure 6:
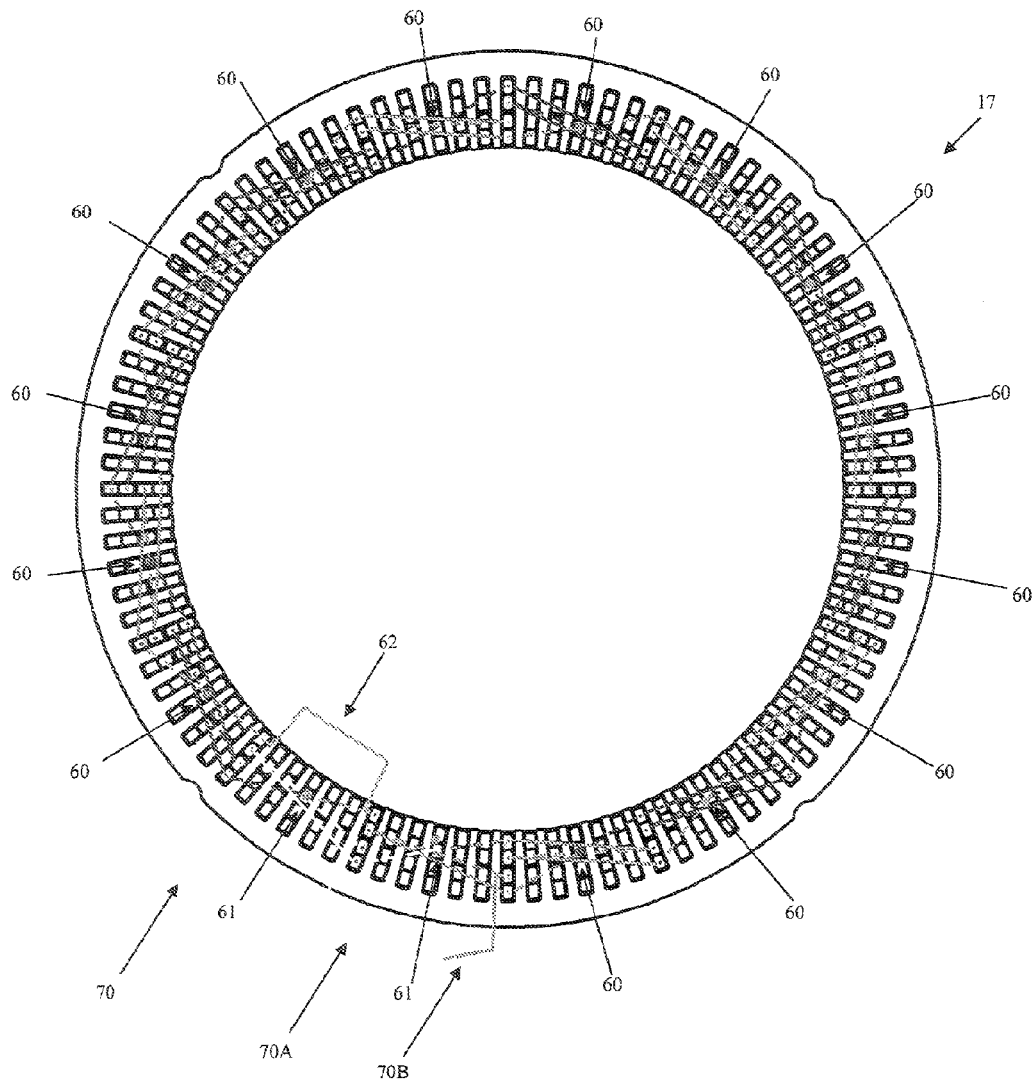
FIG. 6 shows a schematic representation of the path of a phase winding in the slots of a laminated stator core.

FIG. 6 shows a schematic representation of the course of one phase winding in the laminated stator core. A laminated core is depicted here, having ninety-six slots in which generally six phase windings are disposed. In this case, the rotor has sixteen poles. Because of the schematic character of the representation in FIG. 6, for the sake of clarity, the other five phase windings are not depicted. It is possible to adapt the invention presented here to any number of phase windings and poles, for example, a laminated stator core having sixty slots and five phase windings and a rotor having twelve poles.

Continuous-line connections are disposed on the electronics-side winding overhang. Connections represented with a dashed line are disposed on the drive-end winding overhang.

Phase winding 70 is made up of one connection form of winding element 61, seven basic forms of winding element 60, one reversal form of winding element 62, seven further basic forms of the winding element and one further connection form of the winding element, which are all connected in series according to the order specified. The laminated stator core is thereby traversed by this phase winding 70 once in and once counter to a first circumferential direction, all slot positions of all slots assigned to this phase winding being occupied.

Phase windings 71, 72, 73, 74, 75 not shown in FIG. 6 are identical to phase winding 70 shown, and are displaced by a fixed slot number in the circumferential direction relative to phase winding 70 shown. Due to this slot displacement, in this example, a phase angle of 30 electrical degrees or a multiple of 30 electrical degrees results between phase windings 70, 71, 72, 73, 74, 75.

Accordingly, an alternating-current generator, in particular a three-phase generator, is provided for a motor vehicle, having a rotor 20 including north and south poles, particularly with claw-pole fingers 24, 25 extending in the axial direction and alternating as north and south poles at the periphery of rotor 20, a stator 16 which has a magnetic core, especially laminated core 17, with slots 15 and a stator winding 18 disposed in slots 15 of the magnetic core, stator winding 18 having winding overhangs 45, 46 that in each case are able to be cooled by an approximately radial air flow produced by at least one fan 30 mounted at rotor 20, stator 16 being situated opposite rotor 20, and stator 16 and rotor 20 having defined positions relative to each other, multiphase stator winding 18 being made up of winding elements 60, 61, 62, 63, 64, 65, 66, 67, at least one winding element having more than two sections inserted in slots, and at least one winding element 60, 61, 62, 63, 64, 65, 66, 67 having more than one reversal section which brings about a change in the radial position.

Figure 7:
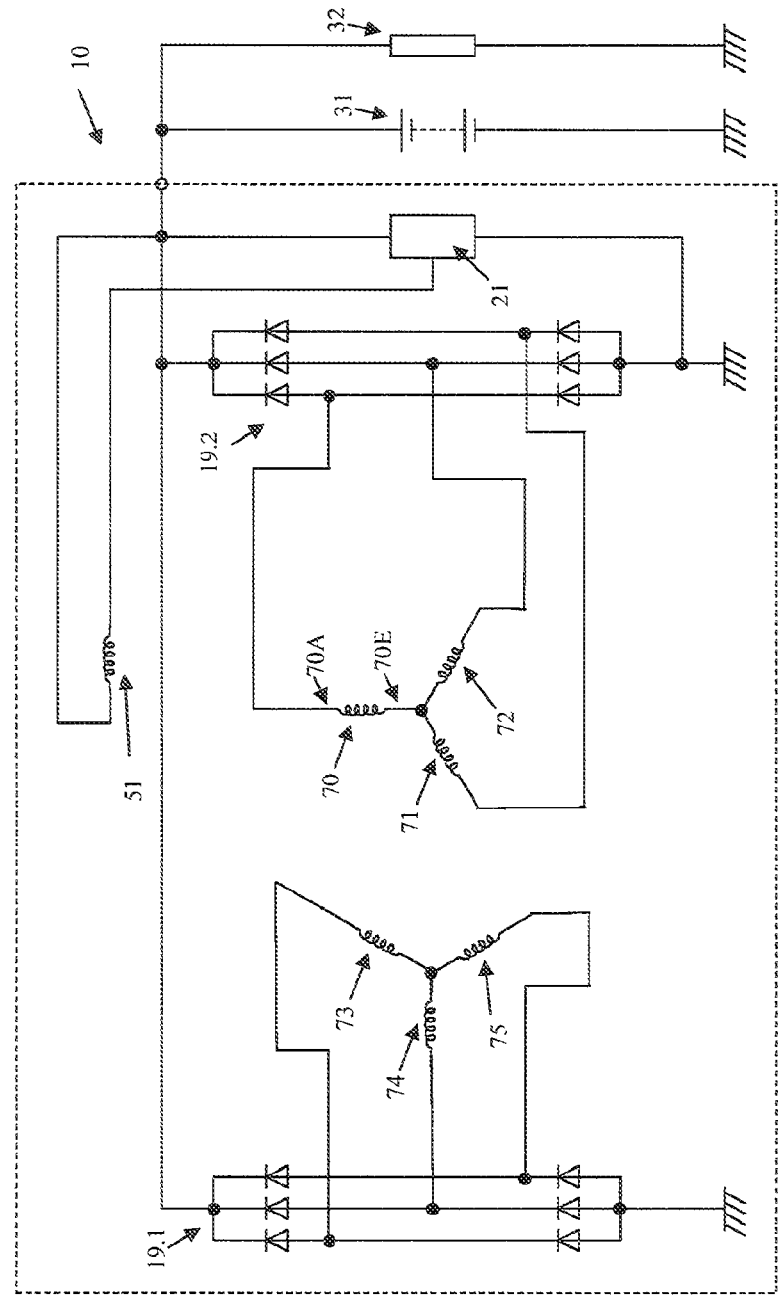
FIG. 7 shows a circuit diagram of an alternating-current generator having two independent three-phase systems which are interconnected to two downstream rectifiers.

In FIG. 7, an alternating-current generator 10 having six phase windings 70, 71, 72, 73, 74, 75 is represented with the aid of a circuit diagram. The six phase windings 70, 71, 72, 73, 74, 75 are interconnected to form two independent three-phase systems, each of the independent three-phase systems having a star connection, whose phase windings 70, 71, 72-73, 74, 75 have a phase difference of 120 electrical degrees at the star point. The star connections are formed by phase windings U1, V1, W1 (70, 71, 72) and U2, V2, W2 (73, 74, 75), respectively. The two independent three-phase systems have a phase difference of 30 electrical degrees. Each of the two three-phase systems is connected to a separate B6 bridge rectifier 19.1, 19.2, which are connected in parallel on the direct-voltage side.

Rectifier 19 is therefore made up of two parallel-connected bridge rectifiers 19.1, 19.2. On the direct-voltage side, a voltage regulator 21 is connected in parallel to rectifier 19. By influencing the current which flows through exciter winding 51, the voltage regulator regulates the voltage of the generator and therefore of the vehicle electrical system. The vehicle electrical system is represented schematically by vehicle battery 31 and by vehicle loads 32. The three-phase systems are independent in so far as the windings are first interconnected downstream of the two B6 bridge rectifiers 19.1 and 19.2.

FIGS. 8 to 13 show a further specific embodiment for realizing uneven numbers of conductors in the slots.

FIG. 8 shows a schematic representation of a first basic form of a winding element 63 for a realization form of a winding having three conductors in each slot, the narrow sides of the conductor cross-sections being located opposite each other and the broad sides of the conductor cross-sections facing the slot walls (not shown here). The conductors are disposed in the slot in three radial slot positions, the radially outermost slot position being denoted as slot position one and the radially innermost slot position being denoted as slot position three. The first basic form of a winding element for uneven numbers of conductors 63 is made up of at least one essentially axially aligned first connecting section 63*a*, which is used for contacting two radially adjacent connecting sections 63*a*, 63*z*, 66*z*.

To that end, it is advantageous if the broad side of the conductor cross-section in the area of the connecting sections is aligned parallel to the circumferential direction, since the contacting area is thereby increased. The contacting is accomplished integrally, for example, by welding, soldering or other methods for electrical contacting.

First connecting section 63*a* merges into a first section 63*b* that is inclined with respect to the axis direction and circumferential direction and connects first connecting section 63*a* to a first axially aligned section 63*c* of winding element 63 inserted in a slot 15. First section 63*c* lying in a first slot changes into a second section 63*d* inclined with respect to the axis direction and circumferential direction, which further merges into a first reversal section 63*e*.

Going out from first reversal section 63*e* is a third section 63*f* inclined with respect to the axis direction and circumferential direction, which connects first reversal section 63*e* to a second section 63g inserted in a second slot 15. This second section 63g lying in slot 15 is connected to a fourth section 63h inclined with respect to the axis direction and circumferential direction, which merges into a second reversal section 63i that is further connected via a fifth section 63j, inclined with respect to the axis direction and circumferential direction, to a third section 63k of winding element 63 inserted in the first slot. Third section 63k lying in the slot is joined via a sixth section 63l, inclined with respect to the axis direction and circumferential direction, to a third reversal section 63m. Third reversal section 63m is connected via a seventh section 63n, inclined with respect to the axis direction and circumferential direction, to a fourth section 63o inserted in the second slot. Fourth section 63o lying in the slot is further connected via an eighth section 63p, inclined with respect to the axis direction and circumferential direction, to second connecting section 63z of the winding element.

The first basic form of the winding element for uneven numbers of conductors 63 shown here is constructed using three reversal sections 63e, 63i, 63m. It is also conceivable to implement the basic form of winding element 63 using two or more than three reversal sections in order to adapt the winding elements to different uneven numbers of conductors in the slot. This is achieved by decreasing or increasing the number of loops of a winding element. When using two or, for example, four reversal sections, however, winding elements adjoining each other must then be contacted with each other on both sides of laminated core 17, which is associated with higher machinery costs and work required.

In this example, the winding element assumes three different radial positions, the position of the conductors in the winding overhangs being designated by a radial position, and the position of the conductors in slots 15 being designated by a radial slot position, and the radial positions of the slot position and of the radial position of the conductors in the winding overhangs corresponding to each other.

The number of radial positions and that of the radial slot positions usually corresponds to the number of conductors in a slot, given a one-row arrangement of the conductors radially one upon the other. Of winding element 63, disposed in the radially first position are first inclined section 63b, first section 63c inserted in the slot and second inclined section 63d. Winding element 63 occupies the first slot position in a first slot 15, and in the second slot associated with winding element 63, which is set apart from the first in the circumferential direction by essentially one pole pitch, occupies the second slot position. The change in the slot position is brought about by first reversal section 63e. Disposed in the radially second position are essentially third inclined section 63f, second section 63g inserted in a slot, fourth inclined section 63h, second reversal section 63i, fifth inclined section 63j, third section 63k lying in a slot and sixth inclined section 63l.

In this case, second reversal section 63i causes no change in slot position. Third reversal section 63m brings about a change in slot position from the second slot position of the first slot to the third slot position of the second slot. Disposed in the radially third position are seventh inclined section 63n, fourth section 63o inserted in a slot and eighth inclined section 63p.

At the beginning, first connecting section 63a covers parts of the second and first radial position, and then extends completely in the first radial position. Second connecting section 63z extends completely over the third radial position at the beginning, and then covers parts of the second and third radial position.

FIG. 9 shows a schematic representation of a second basic form of a winding element 64 for a realization form of a winding having three conductors in each slot. The second basic form of a winding element 64 for uneven numbers of conductors is made up of at least one essentially axially aligned first connecting section 64a, which is used for contacting two radially adjacent connecting sections 64a, 64z, 66a. To that end, it is advantageous if the broad side of the conductor cross-section in the area of the connecting sections is aligned parallel to the circumferential direction, since the contacting area is thereby increased. The contacting is accomplished integrally, for example, by welding, soldering or other methods for electrical contacting.

First connecting section 64a merges into a first section 64b that is inclined with respect to the axis direction and circumferential direction and connects first connecting section 64a to a first axially aligned section 64c of winding element 64 inserted in a slot 15. First section 64c lying in a first slot changes into a second section 64d inclined with respect to the axis direction and circumferential direction, which further merges into a first reversal section 64e. Going out from first reversal section 64e is a third section 64f inclined with respect to the axis direction and circumferential direction, which connects first reversal section 64e to a second section 64g lying in a second slot 15. This second section 64g inserted in slot 15 is connected to a fourth section 64h inclined with respect to the axis direction and circumferential direction, which is further connected to second connecting section 64z of the winding element.

The second basic form of the winding element for uneven numbers of conductors 64 shown here is constructed using one reversal section 64e. It is also conceivable to implement the basic form of winding element 64 using two or more than two reversal sections in order to adapt the winding elements to different uneven numbers of conductors in the slot.

In this example, the winding element assumes three different radial positions, the position of the conductors in the winding overhangs being designated by a radial position, and the position of the conductors in the laminated-core slots being designated by a radial slot position, and the radial positions of the slot position and of the radial position of the conductors in the winding overhangs corresponding to each other.

Of the winding element, disposed in the radially first position are first inclined section 64b, first section 64c inserted in the slot and second inclined section 64d. Winding element 64 occupies the first slot position in a first slot 15, and in the second slot associated with winding element 64, which is set apart from the first in the circumferential direction by essentially one pole pitch, occupies the third slot position. The change in the slot position is brought about by first reversal section 64e. Disposed in the radially third position are essentially third inclined section 64f, second section 64g inserted in a slot and fourth inclined section 64h.

At the beginning, first connecting section 64a covers parts of the second and first radial position, and then extends completely in the first radial position. Second connecting section 64z extends completely over the third radial position at the beginning, and then covers parts of the second and third radial position.

FIG. 10 shows a schematic representation of the first connection form of a winding element, needed for a complete stator winding, for uneven numbers of conductors 65. This connection form is used to make available an electrical connection for the interconnection of the phase winding, or for the contacting of the rectifier. This connection may be disposed on electronics-side winding-overhang side 46. To form a complete phase winding, at least two connection forms of winding element 65, 67 are necessary, for the phase-winding beginning and the phase-winding end, respectively.

For the most part, the first connection form of winding element 65 corresponds to an abbreviated structure of the first basic form of winding element 63.

The depicted connection form of winding element 65 is provided for realizing a winding having three conductors in each slot, the narrow sides of the conductor cross-sections being located opposite each other and the broad sides of the conductor cross-sections facing the slot wall. Each first connection form of winding element 65 is made up of at least one essentially axially aligned first connecting section 65a, which is used for contacting two radially adjacent connecting sections 63z, 65a.

First connecting section 65a merges into a first section 65b that is inclined with respect to the axis direction and circumferential direction and connects first connecting section 65a to a first axially aligned section 65c of winding element 65 inserted in a slot 15. First section 65c lying in a first slot changes into a second section 65d inclined with respect to the axis direction and circumferential direction, which further merges into a first reversal section 65e. Going out from first reversal section 65e is a third section 65f inclined with respect to the axis direction and circumferential direction, which connects first reversal section 65e to a second section 65g inserted in a slot 15. This second section 65g lying in slot 15 is connected to a fourth section 65h inclined with respect to the axis direction and circumferential direction, which merges into a second reversal section 65i that is further connected via a fifth section 65j, inclined with respect to the axis direction and circumferential direction, to a third section 65k of winding element 65 inserted in the first slot. Third section 65k lying in the slot is connected via a sixth section 65l, inclined with respect to the axis direction and circumferential direction, to connection segment 65y.

The connection form of winding element 65 shown here is constructed using two reversal sections 65e, 65i. In principle, it is also conceivable here to implement the connection form of winding element 65 using one or more than two reversal sections 65e, 65i, in order to adapt the winding to a higher uneven number of conductors in the slot.

In this example, the connection form of winding element 65 is subdivided into two radial positions.

The number of radial positions of the connection form of winding element 65 is usually less by one than the number of conductors in a slot 15. Of the connection form of winding element 65, disposed in the radially first position are first inclined section 65b, first section 65c inserted in the slot and second inclined section 65d. The connection form of winding element 65 occupies the first slot position in a first slot 15, and in second slot 15 associated with winding element 65, which is set apart from the first in the circumferential direction by essentially one pole pitch, occupies the second slot position. The change in the slot position is brought about by first reversal section 65e. Disposed in the radially second position are essentially third inclined section 65f, second section 65g inserted in a slot, fourth inclined section 65h, second reversal section 65i, fifth inclined section 65j, third section 65k inserted in a slot, sixth inclined section 65l and connection segment 65y. In this case, second reversal section 65i causes no change in the radial positions.

At the beginning, first connecting section 65a covers parts of the second and first radial position, and then extends completely in the first radial position. Connection segment 65y extends essentially over the second radial position, but to improve the interconnection of the phase windings, may change from the second radial position to a different radial position.

FIG. 11 shows a schematic representation of the reversal form of a winding element 66 needed for a complete stator winding. The reversal form of a winding element 66 is used to connect first basic forms of winding elements 63 in series with second basic forms 64 shifted by 180 electrical degrees. In this context, the phase-winding course coming from a first circumferential direction is reversed and continued counter to the first circumferential direction. At least one reversal form of winding element 66 is needed to form a complete phase winding. This reversal form of a winding element 66 has at least one reversal section 66e which connects two sections 66c, 66g inserted in slots, in the same slot position.

The depicted reversal form of winding element 66 is provided for a realization with three conductors in each slot, the narrow sides of the conductor cross-sections being located opposite each other and the broad sides of the conductor cross-sections facing the slot wall. Each reversal form of winding element 66 is made up of at least one essentially axially aligned first connecting section 66a, which is used for contacting two radially adjacent connecting sections 66a, 64a.

First connecting section 66a merges into a first section 66b that is inclined with respect to the axis direction and circumferential direction and connects first connecting section 66a to a first axially aligned section 66c of winding element 66 inserted in a slot 15. First section 66c lying in a first slot changes into a second section 66d inclined with respect to the axis direction and circumferential direction, which further merges into a first reversal section 66e. Going out from first reversal section 66e is a third section 66f inclined with respect to the axis direction and circumferential direction, which connects first reversal section 66e to a second section 66g inserted in a slot 15. This second section 66g lying in slot 15 is connected to a fourth section 66h inclined with respect to the axis direction and circumferential direction, which is joined to second connecting section 66z.

The reversal form of winding element 66 shown here is constructed using one reversal section 66e. In principle, it is also conceivable here that the reversal form of winding element 66 may be implemented not only with one, but also with three or any further uneven number of reversal sections, all connecting sections being disposed on one winding-overhang side. It is also possible in principle to implement the reversal form of the winding element using an even number of reversal sections, connecting sections then being disposed on both winding-overhang sides.

In this example, the reversal form of winding element 66 is disposed in one radial position.

The number of radial positions of the reversal form of winding element 66 is usually one. The reversal form may occupy the radially innermost position, thereby ensuring easy assembly. Thus, of the reversal form of winding element 66, disposed in the radially third position are first inclined section 66b, first section 66c inserted in the slot, second inclined section 66d, first reversal section 66e, third inclined section 66f, second section 66g inserted in a slot and fourth inclined section 66h.

At the beginning, first connecting section 66a covers parts of the second and third radial position, and then extends completely in the third radial position. Second connecting section 66z extends completely in the third radial position at the beginning, and then covers parts of the third and second radial position.

FIG. 12 shows a schematic representation of the second connection form of a winding element, needed for a complete stator winding, for uneven numbers of conductors 67. This connection form is used to make available an electrical connection for the interconnection of the phase winding, or for the contacting of the rectifier. This connection may be disposed on winding-overhang side 46 on the electronics side.

To form a complete phase winding, at least two connection forms of winding elements 65, 67 are needed, for the phase-winding beginning and phase-winding end, respectively For the most part, the first connection form of winding element 67 corresponds to an abbreviated structure of the first basic form of winding element 64.

The depicted connection form of winding element 67 is provided for realizing a winding having three conductors in each slot, the narrow sides of the conductor cross-sections being located opposite each other and the broad sides of the conductor cross-sections facing the slot wall. Each connection form of winding element 67 is made up of at least one essentially axially aligned first connecting section 67a, which is used for contacting two radially adjacent connecting sections 64z, 67a.

First connecting section 67a merges into a first section 67b that is inclined with respect to the axis direction and circumferential direction and connects first connecting section 67a to a first axially aligned section 67c of winding element 67 inserted in a slot 15. First section 67c lying in a first slot changes into a second section 67d inclined with respect to the axis direction and circumferential direction, which further merges into a connection segment 67y.

The second connection form of winding element 67 shown here is constructed with no reversal section. In principle, it is also conceivable here to implement the connection form of winding element 67 with two or with any further even number of reversal sections, in order to adapt the winding to a higher uneven number of conductors in the slot.

In this example, the connection form of winding element 67 is accommodated in only one radial position.

The number of radial positions of the second connection form of winding element 67 is usually one. Of the connection form of winding element 67, disposed in the radially first position are first inclined section 67b, first section 67c inserted in the slot, second inclined section 67d and connection segment 67y.

At the beginning, first connecting section 67a covers parts of the second and first radial position, and then extends completely in the first radial position. Connection segment 67y extends essentially over the first radial position, but to improve the interconnection of the phase windings, may change from the first radial position to a different radial position.

Figure 13:
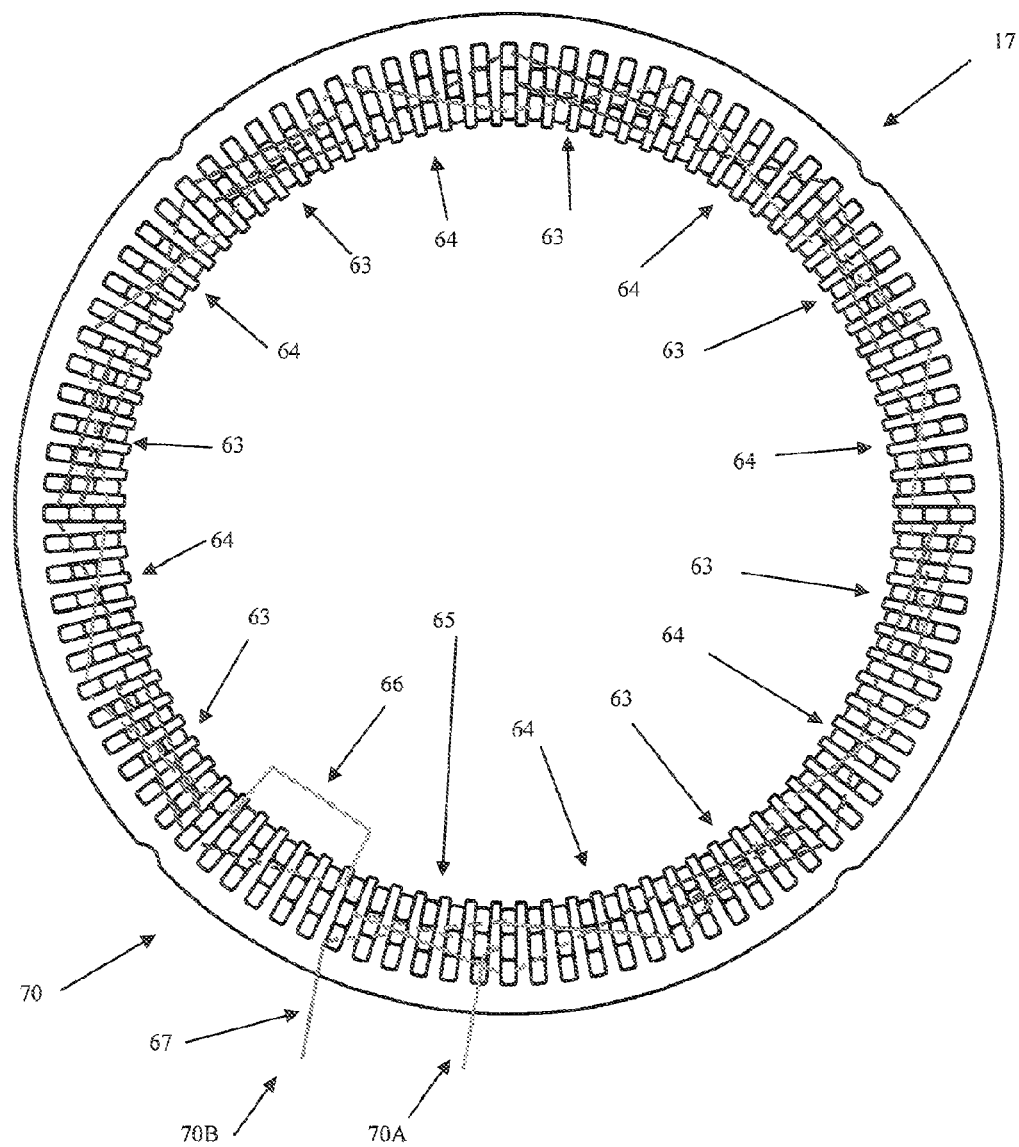
FIG. 13 shows a schematic representation of the path of a phase winding in the slots of a laminated stator core for uneven numbers of conductors.

FIG. 13 shows a schematic representation of the course of one phase winding in the laminated stator core. A laminated core is depicted here, having ninety-six slots in which generally six phase windings are disposed. In this case, the rotor has sixteen poles. Because of the schematic character of the representation in FIG. 6, for the sake of clarity, the other five phase windings are not depicted. It is possible to adapt the invention presented here to any number of phase windings and poles, for example, a laminated stator core having sixty slots and five phase windings and a rotor having twelve poles.

Continuous-line connections are disposed on the electronics-side winding overhang. Connections represented with a dashed line are disposed on the drive-end winding overhang.

Phase winding 70 is made up of a first connection form of winding element 65, seven first basic forms of winding element 63, one reversal form of winding element 66, seven further second basic forms of winding element 64 and one second connection form of winding element 67, which are all connected in series according to the order specified. The laminated stator core is thereby traversed by this phase winding 70 once in and once counter to a first circumferential direction, all slot positions of all slots assigned to this phase winding being occupied.

Phase windings 71, 72, 73, 74, 75 not shown in FIG. 13 are identical to phase winding 70 shown, and are displaced by a fixed slot number in the circumferential direction relative to phase winding 70 shown. Due to the slot displacement, in this example, a phase difference of 30 electrical degrees or a multiple of 30 electrical degrees results between phase windings 70, 71, 72, 73, 74, 75.

Figure 14:
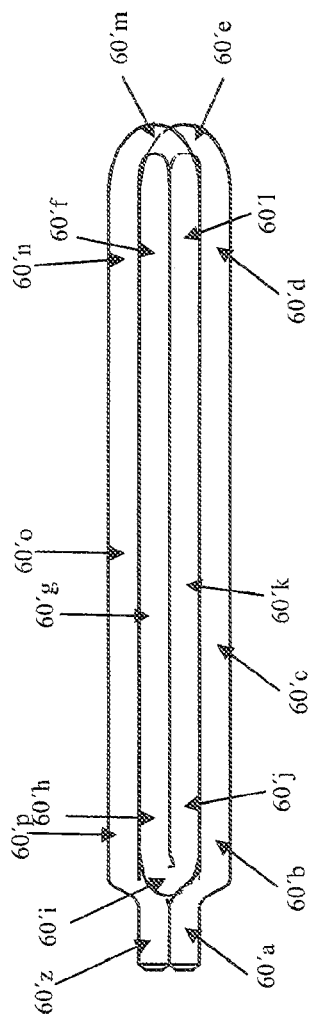
FIG. 14 shows a perspective representation of a flat preliminary stage of a winding element.

As an example for one manufacturing step of a winding element, FIG. 14 shows a preliminary stage of the basic form of a winding element 60 wound essentially in one plane. Connecting sections 60a, 60z are disposed as preliminary stage 60'a, 60'z in the same plane. The sections located in the first slot position, namely, first inclined section 60b, first section 60c inserted in a slot and second inclined section 60d together form a first straight section 60'b, 60'c, 60'd in this preliminary stage.

The sections located in the third slot position, namely, third inclined section 60f, second section 60g inserted in a slot and fourth inclined section 60h together form a second straight section 60'f, 60'g, 60'h in this preliminary stage.

The sections located in the second slot position, namely, fifth inclined section 60j, third section 60k inserted in a slot and sixth inclined section 60l together form a third straight section 60'j, 60'k, 60'l in this preliminary stage.

The sections located in the fourth slot position, namely, seventh inclined section 60n, fourth section 60o inserted in a slot and eighth inclined section 60p together form a fourth straight section 60'n, 60'o, 60'p in this preliminary stage.

In this preliminary stage, reversal sections 60e, 60i, 60m each form a curved section 60'e, 60'i, 60'm, curved sections 60'e, 60'm crossing each other. At the crossing location, curving sections 60'e, 60'm take additional space relative to the plane.

In a further manufacturing step, the preliminary stage of winding element 60' is brought into a first spatial form in which the later first and third sections 60'c, 60'k inserted in slots are pulled apart perpendicular to the winding plane by essentially one pole pitch with respect to the later second and fourth sections 60'g, 60'o inserted in slots, sections 60'c, 60'k, 60'g, 60'o later inserted in slots remaining straight.

In a subsequent manufacturing step, the connecting sections and the inclined sections assigned to them are brought into their predetermined form and position.

The manufacturing method for the other forms of the winding elements is analogous to that described above.

Figure 15:
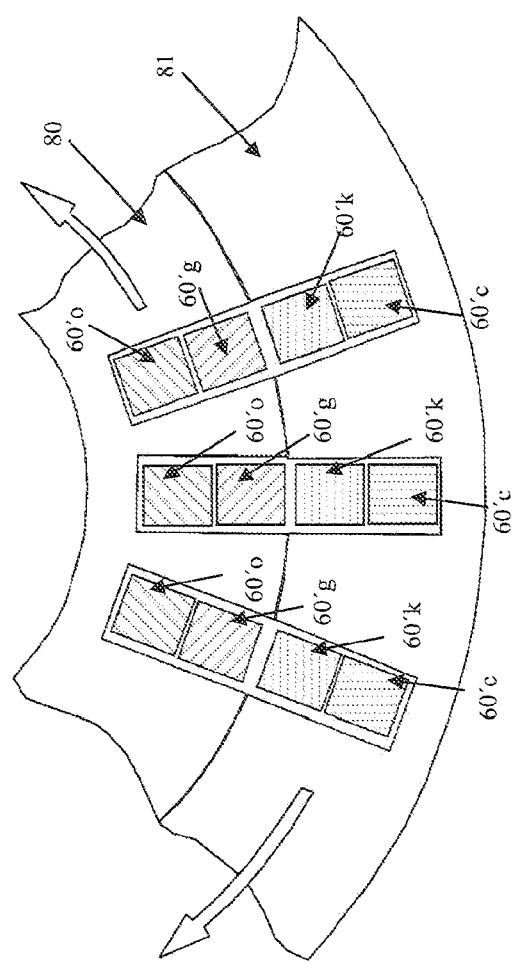
FIG. 15 shows a cylindrical device for producing the spatial structure of winding elements.

FIG. 15 shows a device 80, 81 for the manufacturing method of the present invention for a winding element to assemble into a ring-shaped laminated core. The device is made of two cylinders or cylinder segments 80, 81 lying in one another and rotatable with respect to each other in the circumferential direction. In the outer area, the inner cylinder or inner cylinder segment 80 has slots, into which the preliminary stages of the later inner slot sections 60'o, 60'g are inserted. In the inner area, the outer cylinder or outer cylinder segment 81 has slots, into which the preliminary stages of the later outer slot sections 60'c, 60'k are inserted.

After fitting the device with the corresponding flat preliminary stages of winding elements 60', 61', 62', 63', 64', 65', 66', 67', the inner cylinder or cylinder segment 80 is rotated by approximately one pole pitch in the circumferential direction relative to the outer cylinder or cylinder segment 81. The spatial structure of the winding element is thereby produced to a great extent. Winding elements 60 thus formed are suited to be inserted into a round laminated stator core having radially inwardly open slots, since the sections of the winding elements lying in the slots are aligned in the radial direction.

In accordance with the manufacturing principle for the basic form of the winding element for four conductors in slot 60, it is also possible to produce the first basic form of the winding element for three conductors in slot 63, in that, by an additional production step, the sections of the winding element lying in different slots are displaced radially relative to each other by one slot position.

Figure 16:
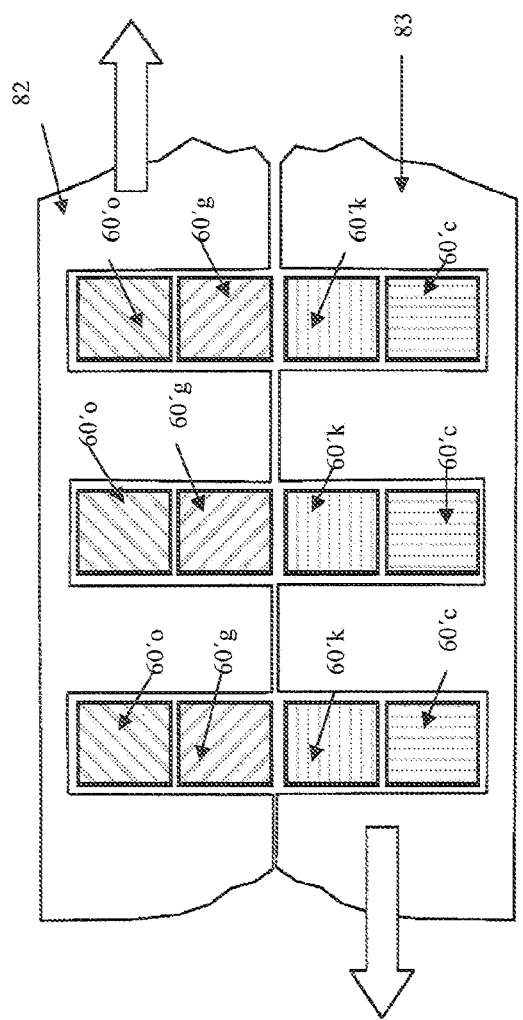
FIG. 16 shows a cuboidal device for producing the spatial structure of winding elements.

FIG. 16 shows a device 82, 83 for the manufacturing method of the present invention for a winding element to assemble into a cuboidal laminated core. The device is made of two mated cuboidal device parts, hereinafter called upper part and lower part 82, 83. Upper part 82 has slots on the bottom side. Lower part 83 has slots on the top side. Device parts 82, 83 are three-dimensionally displaceable relative to each other. The later inner slot sections 60'$o$, 60'$g$ are inserted into slots of upper part 82, and the later outer slot sections 60'$c$, 60'$k$ are inserted into the slots of lower part 83. After the device is fitted with one or more preliminary stages 60', the upper part is shifted compared with the lower part in the direction of the arrows by approximately one pole pitch. The spatial structure of the winding element is thereby produced to a great extent. Winding elements 60 thus formed are suitable for insertion into a cuboidal laminated core having slots open to one side; after the cuboidal laminated core has been bent into a round form, the slot openings are situated opposite the rotor, since the sections of the winding elements lying in the slots are aligned parallel to the slot-depth direction.

In accordance with the manufacturing principle for the basic form of the winding element for four conductors in slot 60, it is also possible to produce the first basic form of the winding element for three conductors in slot 63, in that, by an additional production step, the sections of the winding element lying in different slots are displaced relative to each other by one slot position in the slot-depth direction.

Winding elements 60 provided for assembly into a cuboidal laminated core are aligned in parallel in the slot-depth direction with their sections lying in the slots. A cuboidal laminated core fitted with all winding elements is bent into a round form, so that the two laminated-core ends are opposite each other touching and are integrally joined. After the bending of the laminated core, the connecting sections of the winding elements are integrally joined to each other, for example, by welding, and the phase windings are thus produced. A protective layer applied on the welded connecting sections protects against corrosion and serves as electrical insulator.

It is advantageous if the sections of the winding elements later lying in slots are insulated prior to insertion into the laminated core. In so doing, the respective sections of a winding element adjacent in the slot-depth direction and lying in the slots may be insulated together. An overlapping region of the insulation may be disposed along the slot walls or between the sections of two winding elements lying in the slots. It is advantageous if the insulation adheres to the sections of the winding elements lying in the slots.

Figure 17:
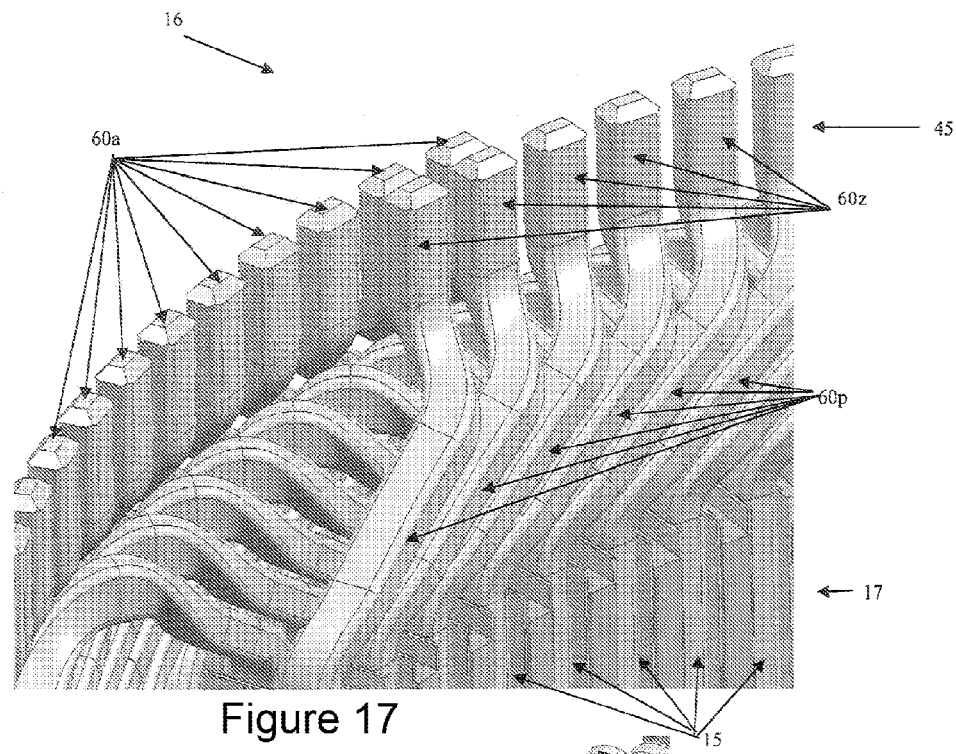
FIG. 17 shows a cut-away portion of a perspective representation of a stator according to the present invention.
Figure 18:
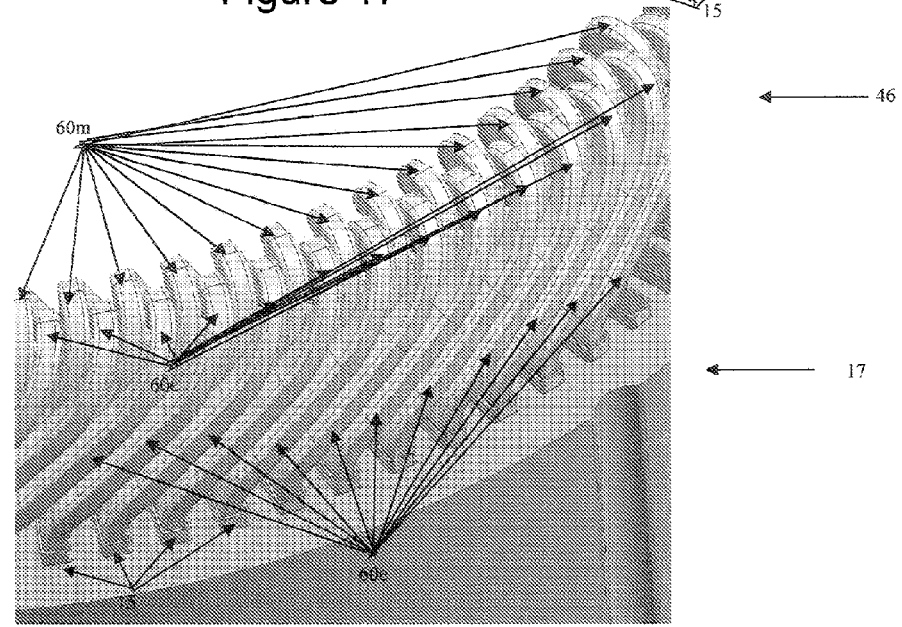
FIG. 18 shows a cut-away portion of a perspective representation of a stator according to the present invention.

FIG. 17 and FIG. 18 show a cut-away portion of a perspective representation of a stator 16 according to the exemplary embodiments and/or exemplary methods of the present invention. The alignment of the broad side of the conductor cross-section in the area of sections 60$c$, 60$g$, 60$k$, 60$o$ lying in the slots is parallel to the slot-depth direction, and in the area of connecting sections 60$a$, 60$z$, in the circumferential direction. Reversal sections 60$i$ bring about a change in the radial slot position of sections 60$c$, 60$g$, 60$k$, 60$o$ lying in slots, from a first slot 15 to a second associated slot 15. The sections disposed outside of laminated core 17 and sections 60$a$, 60$b$, 60$d$, 60$e$, 60$f$, 60$h$, 60$i$, 60$j$, 60$l$, 60$m$, 60$n$, 60$p$, 60$z$ thereby forming winding overhangs 45, 46 are set apart from each other and form defined flow-through openings through winding overhang 45, 46 which channel the radial flow of cooling air.

Moreover, it is provided that one winding element of the stator winding has at least one section lying in slots and having a cross-section adapted to the slot shape as a function of the slot position; this holds true, for example, in the case of sections which are based on initially round wire and are shaped.

The shape of the slot should be rectangular. This leads to a high slot fill factor when working with a rectangular wire cross-section, so that the ohmic phase-winding resistance is reduced.

The total number of winding elements contained in a stator corresponds at least to the slot number of the stator.

As both exemplary embodiments show, the number of sections lying in slots 15 is an even or uneven number.

Based on the types of winding elements used, each phase winding includes at least one basic form and one connection form of the winding element. This holds true, for example, when the phase winding is oriented in only one circumferential direction.

What is claimed is:

1. An alternating-current generator, which is a multi-phase generator, for a motor vehicle, comprising:
 a rotor including north and south poles, having claw-pole fingers extending in the axial direction and alternating as north and south poles at the periphery of the rotor; and
 a stator having a magnetic core, the magnetic core being a laminated core, having slots and a multiphase stator winding disposed in the slots of the magnetic core, the stator winding having winding overhangs that in each case are able to be cooled by an approximately radial air flow produced by at least one fan mounted at the rotor, the stator being situated opposite the rotor, and the stator and the rotor having defined positions relative to each other, the multiphase stator winding being made up of winding elements, at least one winding element having at least more than two sections inserted in the slots, and at least one winding element having more than one reversal section which brings about a change in a radial position;
 wherein the sections in the slots are arranged in each slot in one radial row,
 wherein the winding element has a number of loops,
 wherein the change in a radial position at a first reversal section is greater than in a second reversal section and the change in a radial position at a third reversal section is greater than in the second reversal section, and
 wherein the first reversal is followed by the second reversal in the direction of the wire path, and wherein the second reversal is followed by the third reversal in the same direction of the wire path.

2. The alternating-current generator of claim 1, wherein one of the winding elements of the stator winding has at least four sections lying in the slots and having a cross-section adapted to a shape of the slot as a function of the slot position.

3. The alternating-current generator of claim 1, wherein the shape of the slot is rectangular.

4. The alternating-current generator of claim 1, wherein the change of radial positions in uneven reversal sections is greater than in even reversal sections.

5. The alternating-current generator of claim 1, wherein a broad side of a conductor cross-section in an area of the more than two sections is aligned parallel to a circumferential direction.

6. The alternating-current generator of claim 1, wherein a broad side of a conductor cross-section of the more than two sections inserted in the slots is aligned parallel to a slot-depth direction.

7. The alternating-current generator of claim 1, wherein a total number of winding elements contained in a stator corresponds at least to a slot number of the stator.

8. The alternating-current generator of claim 1, wherein a number of sections inserted in the slots is an uneven number.

9. The alternating-current generator of claim 1, wherein sections of the winding elements which are disposed outside of the laminated core and form the winding overhangs are set apart from each other at least in some areas and form defined flow-through openings for a radial flow of cooling air.

10. The alternating-current generator of claim 1, wherein each phase winding includes at least one basic form and one connection form of the winding element.

11. The alternating-current generator of claim 1, wherein one of the winding elements of the stator winding has at least four sections lying in the slots and having a cross-section adapted to a shape of the slot as a function of the slot position, wherein the shape of the slot is rectangular, and wherein the change of radial positions in uneven reversal sections is greater than in even reversal sections.

12. The alternating-current generator of claim 11, wherein a broad side of a conductor cross-section in an area of the more than two sections is aligned parallel to a circumferential direction.

13. The alternating-current generator of claim 11, wherein a broad side of a conductor cross-section of the more than two sections inserted in the slots is aligned parallel to a slot-depth direction.

14. The alternating-current generator of claim 11, wherein a total number of winding elements contained in a stator corresponds at least to a slot number of the stator.

15. The alternating-current generator of claim 11, wherein a number of sections inserted in the slots is an uneven number.

16. The alternating-current generator of claim 11, wherein sections of the winding elements which are disposed outside of the laminated core and form the winding overhangs are set apart from each other at least in some areas and form defined flow-through openings for a radial flow of cooling air.

* * * * *